United States Patent [19]

Thompson

[11] 4,090,093

[45] May 16, 1978

[54] LOAD CONTROLLER

[75] Inventor: Paige W. Thompson, Morrison, Ill.

[73] Assignee: General Electric Company, Fort Wayne, Ind.

[21] Appl. No.: 767,230

[22] Filed: Feb. 9, 1977

[51] Int. Cl.² .......................................... H01H 37/00
[52] U.S. Cl. .................................... 307/117; 174/58; 220/3.94; 361/331
[58] Field of Search .................. 174/48, 58, 81, 50; 361/356, 357, 331, 380; 307/116, 117, 118, 141, 141.4, 141.8; 220/3.3, 3.94, 241

[56] References Cited

U.S. PATENT DOCUMENTS

| | | | |
|---|---|---|---|
| 3,388,885 | 6/1968 | Holmes | 248/310 |
| 3,578,932 | 5/1971 | Holmes | 200/168 |
| 3,852,514 | 12/1974 | Lauben | 174/58 |
| 3,892,911 | 7/1975 | Codrino | 174/59 |

Primary Examiner—Robert K. Schaefer
Assistant Examiner—Morris Ginsburg
Attorney, Agent, or Firm—Joseph E. Papin

[57] ABSTRACT

A load controller has a plurality of operating component units adapted for controlling the supply of power from a source thereof to a load. A pair of separable housings are releasably engaged with each other so as to define a chamber in which the unit plurality is enclosed.

44 Claims, 9 Drawing Figures

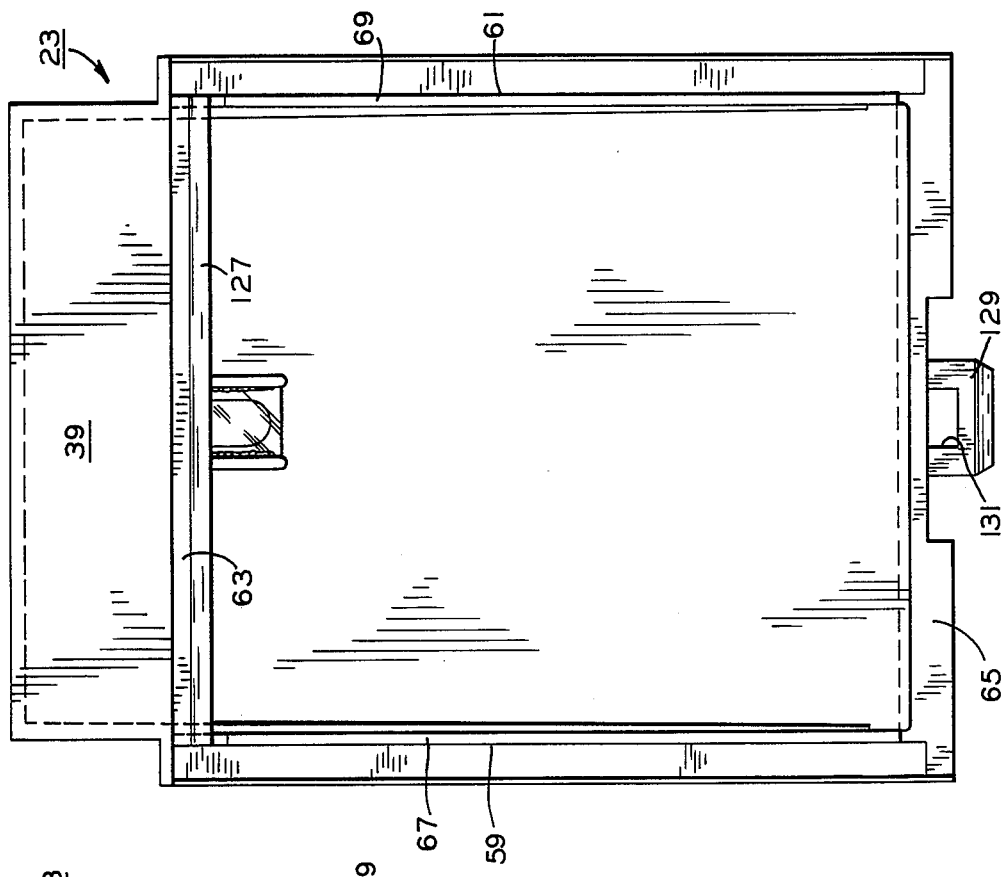
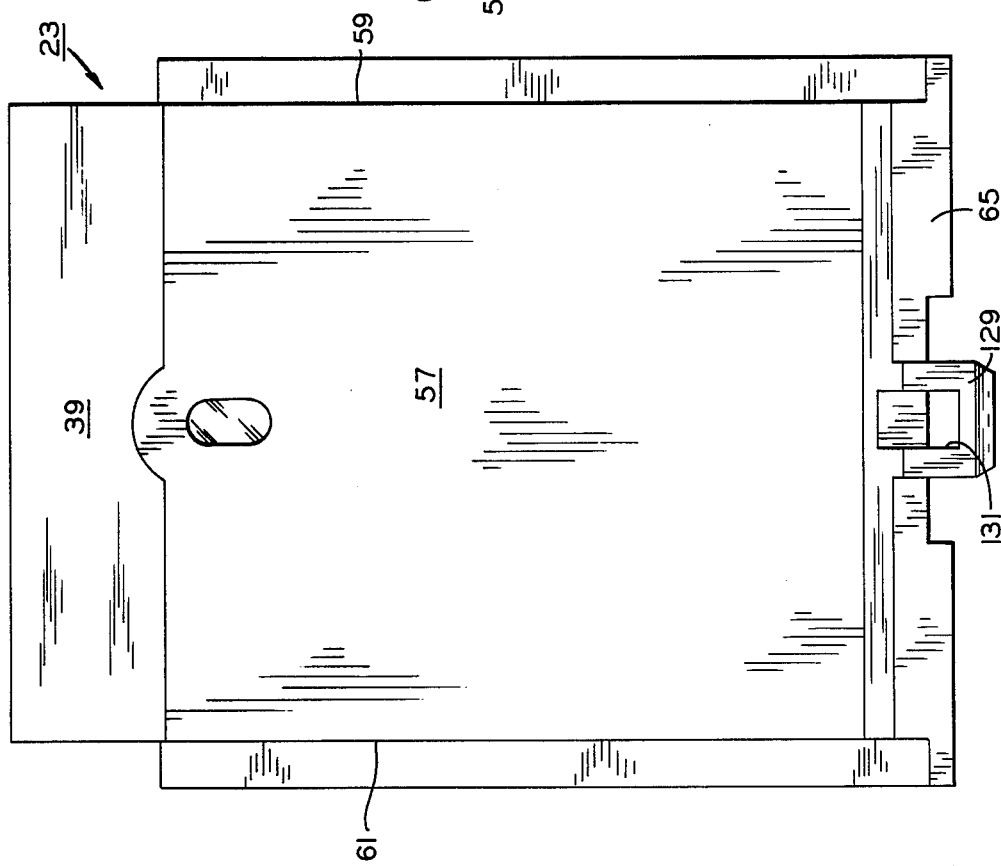

LOAD CONTROLLER

FIELD OF THE INVENTION

This invention relates in general to electric control devices and in particular to a load controller for alleviating peaking type power demand on an electrical utility company's network.

BACKGROUND OF THE INVENTION

Electrical utility companies have all experienced a dramatic increase in the costs to serve their customers and these steeply increased costs have not always been offset by commensurate increased rates. This problem has been compounded as the energy base shifts toward a greater use of electricity. One of the more significant causal factors is the need for these utilities to provide and maintain generating facilities and distribution networks which are ample by a safe margin to meet the demand for electric power during periods of peak or maximum demand that occur only during certain times of the day, week and year. In a particular area or community, for example, these periods of peak or maximum demand occur only during certain months of the year, and during these months, only under particular conditions. The rate of electrical power consumption during other than these peak periods in most communities is considerably less than the peak demand, and accordingly a substantial percentage of the generating facilities and transmission networks of a utility company, representing a considerable capital investment, remains idle a good portion of the time. This substantially increases the overall operating costs of a utility which in turn increases the cost of electricity to the consumers. For every kilowatt of peak load over average load, a utility must invest hundreds of dollars in extra capacity. Thus it behooves the electric utilities to make much more efficient use of their facilities and to reduce the peak load in a particular area or community during periods of expected maximum demand.

In the past, various load controllers were utilized in different systems and different methods were employed to predeterminately limit the peaking-type demands on the power generating capacity of the electrical utility companies; however, one of the disadvantageous or undesirable features of at least some of such prior art load controllers is believed to be that they were generally much too complex both in design and operation so as to incur the resultant disadvantageous or undesirable feature of being generally too expensive for wide spread commercial usage in a power distribution system or network.

In some of the other prior art load controllers, a radio-type signal emanated from the utility company to disconnect a certain group or groups of their power customers' loads from the power line; however, at least one of the disadvantageous or undesirable features of this particular prior art load controller is believed to be that the customers' loads may be disconnected for an inordinately long period of time at the whim of the utility company causing inconvenience and/or uncomfortable conditions for such customers while other customers are provided with power. Also such radio actuated prior art load controllers possibly could be undesirably actuated by a spurious signal. In still some others of the prior art load controllers, a ripple signal is emanated from the utility company through their power network lines to disconnect their power customers' loads from the power line; however, at least the disadvantageous or undesirable features of this particular ripple signal load controller is believed to be generally the same as those discussed hereinabove with respect to the radio signal type load controller.

In another one of the prior art time and temperature related type load controller, the theory of operation is generally based upon preconceived or predicted periods during which peaking-type demands were known to occur in the past. A photocell device is responsive generally to the first light of day for actuating a timer which, in effect, sets the prior art device to be operative only during the predicted period of peaking-type demands for taking the regulated load off the line. This prior art load controller is also provided with an atmospheric temperature sensing mechanism which is operable generally to take the load off the line if the sensed atmospheric temperature exceeds a selected value when such prior art device is set to operate during the predicted period. The load thereafter is off the line until the sensed atmospheric temperature falls below the selected value thereof and/or until the time of the predicted period of the peaking-type demand passes for that particular day.

In at least those past load controllers which were actuated in response to a preselected level of the atmospheric temperature indicative of the occurrence of peak power demand periods on the utility company's lines, such load controllers, or at least the temperature sensing element, were necessarily mounted outdoors so as to be subjected to the atmospheric temperature. Due to the outdoor mounting of some of these past load controllers, it was necessary, if not mandatory, to provide a tamper-proof housing to encase the electrical operating component units of such past load controllers from the stand-point of safety and also vandalism. Typically, these tamper-proof housings were provided in various forms to meet utility company requirements. One such tamper-proof housing was that of the well known utility company watt-hour meter with, of course, slight modifications. The typical watt-hour meter housing has a base to which are attached the electromechanical watt-hour meter components, and the base may be plugged into a utility company receptacle therefor. A clear glass or plastic-type cover is attached to the base to encase the electromechanical watt-hour meter components, and a seal is connected between the base and the cover so as to prevent or afford an indication of surreptitious or other unauthorized access into the watt-hour meter housing. The seal itself may take the form of a small steel cable passing through a stationary hasp arrangement on the cover and base of the watt-hour meter housing with the ends of the cable being sealed or joined together in a lead or other malleable wafer. While such watt-hour meter type housings may, in some instances, be desirable for encasing the electromechanical or other power controlling units of a load controller, it is believed that at least one of the disadvantageous or undesirable features thereof is that such housings are unnecessarily complex and much too expensive for the usual load controller mechanism. An analogous disadvantageous or undesirable feature of the watt-hour meter type housing is believed to be that they contain some features not required for many load controllers and lack certain other features which are desired; therefore, in many instances, modification of some expense may be required.

SUMMARY OF THE INVENTION

Among the several objects of the present invention may be noted the provision of a load controller which overcomes the disadvantageous or undesirable features discussed herein-before, as well as others, with respect to the prior art load controllers; the provision of a load controller having mounting means exteriorly of a separable housing therefor accessible upon separation of such housing but which is generally concealed so as to be inaccessible when the housing is assembled; the provision of a load controller having a plurality of operating component units which are simply and easily mounted within the separable housing of the load controller; the provision of such load controller in which the operating component units thereof are retained in their mounted positions in the separable housing by means of a single retaining means; the provision of such load controller in which a pair of housing members of the separable housing thereof are simply and easily assembled into positions releasably engaged with each other against displacement therefrom; the provision of such load controller in which ready access is provided to the operating component units for the simplistic mounting and removal thereof from the separable housings upon the separation thereof; the provision of such load controller in which a sensing means of one of the operating component units thereof is predeterminately spaced from the immediate environment of such units within the separable housing. These as well as other objects and advantageous features of the load controller of the present invention will be in part apparent and in part pointed out hereinafter.

In general, a load controller in one form of the invention has a plurality of operating component units adapted for controlling the supply of power from a source thereof to a load. A pair of separable housing members are releasably engaged with each other so as to define a chamber in which the units are enclosed, and a plurality of mounting means receiving apertures in one of the housing members is adapted for ready access when the other of the housing members is disengaged from the one housing member. Means is provided on the one housing member exteriorly of the chamber for mounting the load controller and in which the aperture plurality is positioned, and means on the other housing member is disposed generally in overlaying relation with the mounting means for at least in part covering the aperture plurality so as to obviate the ready access thereto when the housing members are disposed in the releasable engagement with each other.

Also in general and in one form of the invention, a load controller has at least a pair of operating component units adapted for controlling the supply of power to a load, and a separable housing having a plurality of wall means defines a chamber in which the at least pair of units are enclosed. Support means integral with at least one of the wall means of the wall means plurality extends into the chamber between another pair of the wall means of the wall means plurality, and a free end portion on the support means is disposed within the chamber. A pair of means are provided in the support means for releasably receiving in mounting engagement a part of the at least pair of units, respectively, and means is connected to the free end portion of the support means for respective positioning engagement with the at least pair of units so as to retain them against displacement from the receiving means.

Further in general, a load controller in one form of the invention has a plurality of operating component units adapted for controlling the supply of power from a source thereof to a load. A pair of separable housing members are adapted for releasable engagement with each other and movable with respect to each other generally only in one direction and another direction opposite thereto into assembled positions in the releasable engagement with each other. A plurality of wall means on each of the housing members defines a chamber in which the unit plurality is enclosed when the housing members are disposed in their assembled positions in the releasable engagement with each other. A pair of free end portions are provided on a pair of the wall means of the wall means plurality of one of the housing members and are spaced from each other both laterally and in the one and another directions, respectively, and groove means in one of the free end portions extends generally in the one and another directions. Extension means integral with the other of the end portions includes slot means extending therethrough generally in the one and another directions, and a pair of means integral with a pair of wall means of the wall means plurality of the other of the housing member are provided for extending into the groove means and the slot means upon the movement of the housing members with respect to each other generally only in the one and another directions into their assembled positions, respectively.

Still further in general and in one form of the invention, a load controller has a plurality of operating component units adapted for controlling the supply of power from a source thereof to a load and a pair of separable housing members adapted for releasable engagement with each other defines a chamber in which the unit plurality is mounted. The housing members respectively include a pair of opposed end walls, a pair of opposed intermediate walls respectively integral with the end walls, and first and second pairs of opposed side walls respectively integral with both the end walls and the intermediate walls. Means for generally defining a parting section between the housing members provides ready access to a part of the chamber in one of the housing members wherein the unit plurality may be inserted into the chamber part in a direction generally paralled to one of the intermediate walls into mounting engagement with the one housing member when the other of the housing members is separated therefrom. The parting section defining means includes a first pair of end portions on the end walls and spaced from the intermediate walls integral with the end walls, respectively, and a second pair of end portions on the intermediate walls and spaced from the end walls integral with the intermediate walls, respectively, and the first end portion pairs are disposed generally adjacent the second free end portion pairs when the housing members are engaged with each other. First and second pairs of margin portions on the first and second sidewall pairs intersect with first and second end portion pairs, respectively, and the first and second margin portion pairs are disposed generally in opposed relation with each other when the housing members are engaged with each other.

Still further and in general, a load controller in one form of the invention has a plurality of operating component units adapted for controlling the supply of power from a source whereof to a load with such units including a condition responsive device having means for sensing a preselected condition associated therewith. A pair of separable housing members are releasably engaged with each other and include a plurality of wall means defining a chamber in which the unit plurality is mounted. Means is associated with one of the housing members for receiving at least a part of the sensing means so that it is predeterminately spaced from the immediate environment of the unit plurality in the chamber. The receiving means extends beyond one of the wall means of the wall means plurality and includes another chamber enclosed within the receiving means which communicates with the first named chamber and into which the at least part of the sensing means extends.

BRIEF DESCRIPTION OF THE DRAWINGS

FIG. 7 is a plan view of the cover for the load controller;

FIG. 8 is a rear elevational view of the cover of FIG. 7; and

Corresponding reference characteristics indicate corresponding parts throughout the several views of the drawings.

The exemplifications set out herein illustrate preferred embodiments of the invention in one form thereof and such exemplifications are not to be construed as limiting the scope of the disclosure or the invention in any manner.

DETAILED DESCRIPTION OF THE PREFERRED EMBODIMENTS

Figures 1, 2:
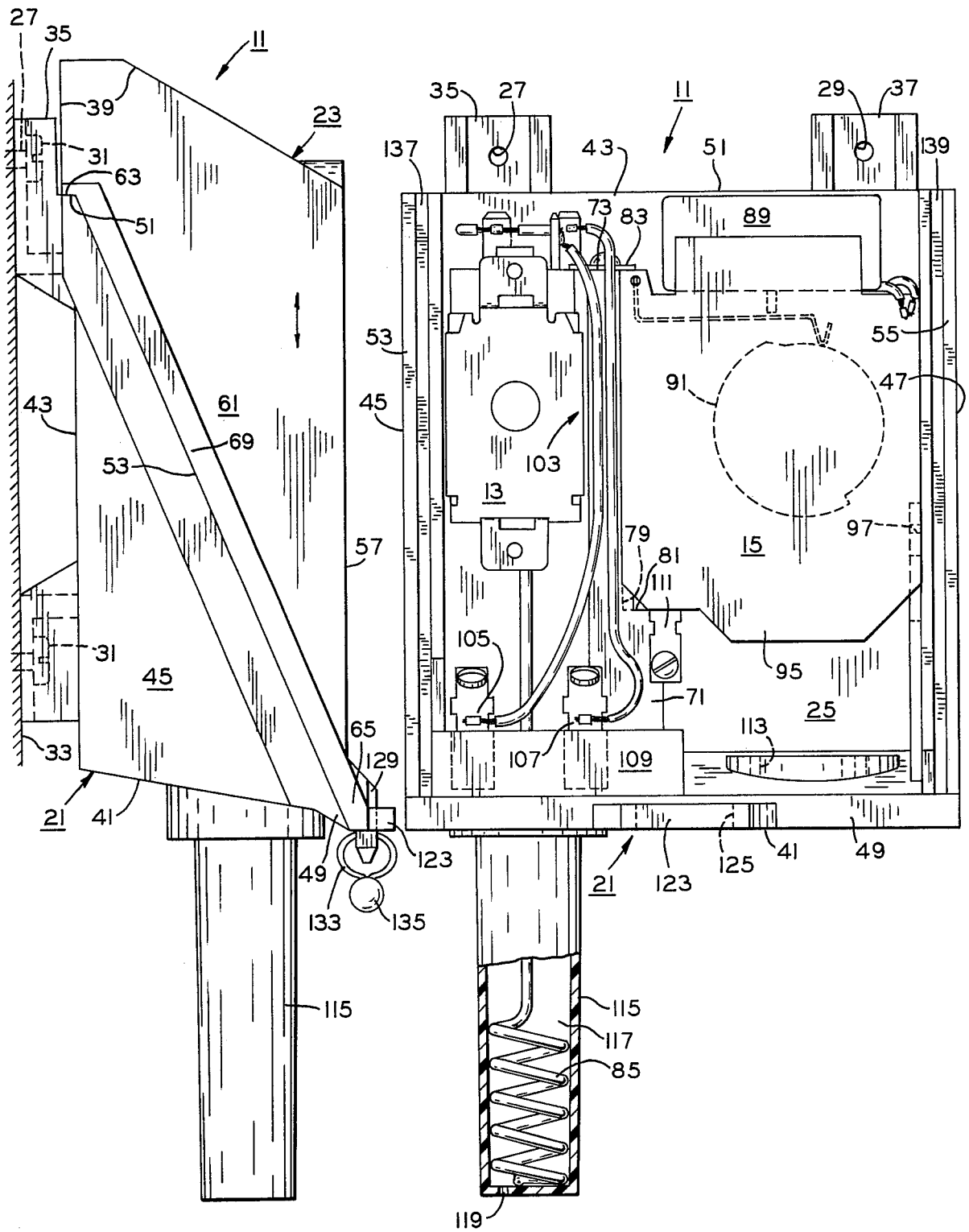
FIG. 1 is a side elevational view of a load controller in one form of the invention shown mounted to a support therefor.
FIG. 2 is a plan view of the load controller of FIG. 1 partially in section and with a cover thereof removed to show the operating component units of the load controller.
Figure 9:
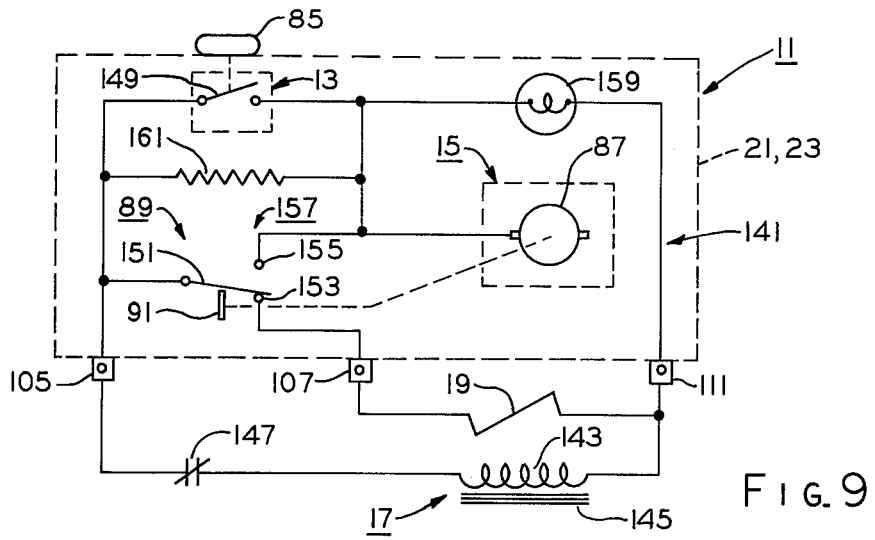
FIG. 9 is a schematic diagram of an exemplary circuit for the load controller.

Referring now to the drawings in general, a load controller 11 in one form of the invention is provided with a plurality of operating component units, indicated generally at 13, 15, (FIGS. 1-4) which are adapted for controlling the supply of power from a source 17 thereof to a load 19 (FIG. 9). A pair of separable housing members 21, 23 are releasably engaged with each other so as to define a chamber 25 in which units 13, 15 are enclosed, and a plurality of mounting apertures or openings 27, 29 provided in housing member 21 are adapted for ready access when housing member 23 is disengaged therefrom (FIGS. 1, 2, 4 and 6). Of course, a plurality of attaching or securing members or means, such as screws 31 or the like for instance, extend through mounting apertures 27, 29 into threaded engagement with a support 33 for attaching or securing load controller 11 thereto (FIG. 1). Means, such as a plurality of mounting lugs or flanges 35, 37, is provided on housing member 21 exteriorly of chamber 25 for mounting load controller 11, and mounting apertures 27, 29 are respectively positioned in the mounting means or lugs extending therethrough. Means, such as at least a part of an end wall 39 of housing 23 is disposed generally in overlaying relation with lugs 35, 37 for at least in part covering or concealing mounting apertures 27, 29 so as to obviate the ready access thereto when housing members 21, 23 are disposed in the releasable engagement with each other. Of course, it is contemplated that various types or arrangements of mounting lugs other than lugs 35, 37 as well as attaching means other than screws 31 may be utilized within the scope of the invention so as to meet the objects and advantageous features thereof.

Figure 5:
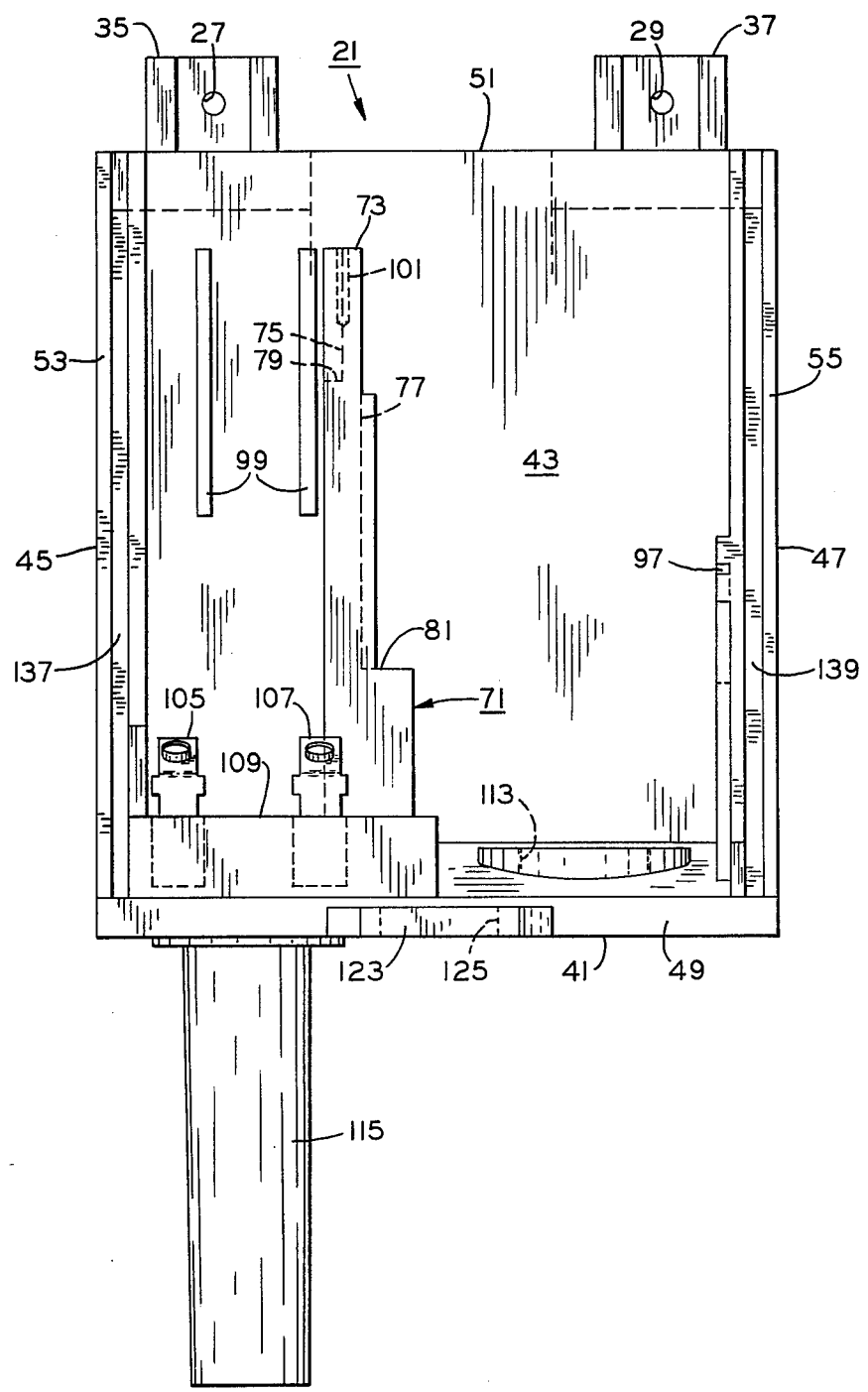
FIG. 5 is a plan view of the one housing of FIG. 4.
Figure 6:
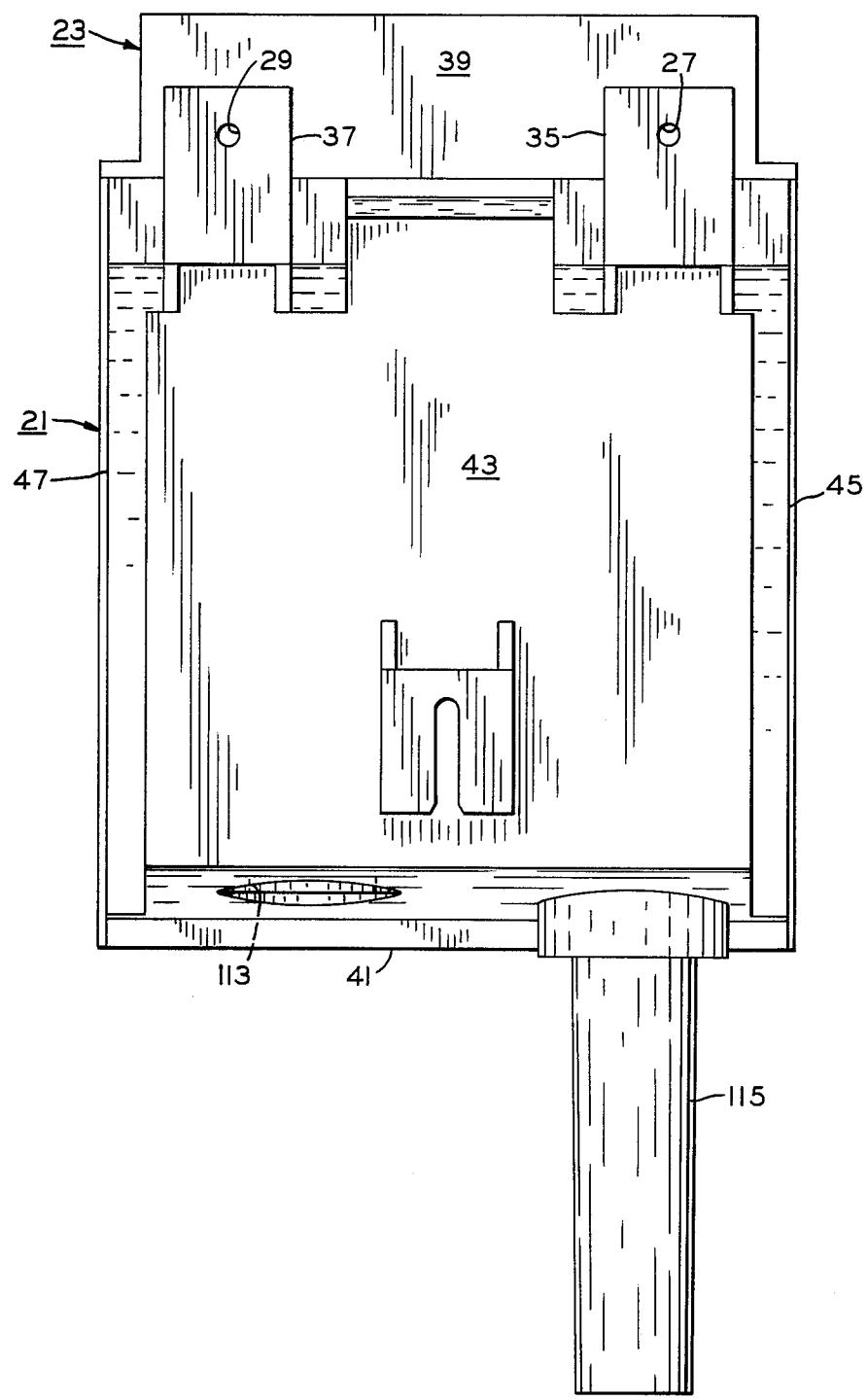
FIG. 6 is a rear elevational view of the one housing of FIG. 4.

More particularly and with specific reference to FIGS. 1, 5 and 6, housing members 21, 23 may be, if desired, integrally molded or otherwise formed of any suitable plastic material or the like having good dielectric characteristics, and since load controller 11 may be mounted outdoors, it is desirable that such housing members have good weathering characteristics. Housing members 21, 23 are each provided with a plurality of wall means adapted for cooperation so as to fit together and define chamber 25 when the housing members are disposed in their assembled position in releasable engagement with each other, as discussed hereinafter.

The wall means plurality of housing member 21 includes an end wall 41, an intermediate, rear or mounting wall 43, and a pair of generally triangularly shaped sidewalls 45, 47 integrally formed or interconnected between the end wall and the intermediate wall. A pair of end or margin portions 49, 51 are respectively provided on end wall 41 and intermediate wall 43, and these end portions are both laterally and vertically spaced from each other, i.e., horizontally and vertically as compared with the short and long sides of the drawing sheet and best seen in FIG. 1). A pair of side margin or edge portions 53, 55 are respectively provided on sidewalls 45, 47 and extend generally diagonally of housing member 21 so as to intersect with end portions 49, 51 on end and intermediate walls 41, 43, respectively.

As shown in FIGS. 1, 7 and 8, the wall means plurality of housing member or cover 23 includes end wall 39, another intermediate or face wall 57, and another pair of generally triangularly shaped sidewalls 59, 61 integrally formed between end and intermediate walls 39, 57. Another pair of end or margin portions 63, 65 are respectively provided on end wall 39 and intermediate wall 57, and these end portions are also laterally and vertically spaced from each other; i.e., horizontally and vertically spaced as compared with the short and long sides of the drawing sheets and best seen in FIG. 1. Another pair of side margin or edge portions 67, 69 are respectively provided on sidewalls 59, 61 and extend generally diagonally of housing member 23 so as to intersect with end portions 63, 65 on end and intermediate walls 39, 57, respectively.

When housing members 21, 23 are disposed in their assembled positions in releasable engagement with each other, end walls 39, 41 and intermediate walls 43, 57 are respectively disposed generally in opposed spaced relation, and sidewalls 45, 47 and 59, 61 are respectively disposed so as to be generally aligned with each other. Further, end portions 49, 51 and side margin portions 53, 55 of housing member 21 are also disposed in opposed relation and engagement with end portions 65, 63 and side margin portions 69, 67 of housing member 23, respectively. It may be noted that the aforementioned disposition of the respective end portions and side margin portions of housing members 21, 23 comprises means for generally defining a parting section between the housing members so as to provide ready access to a part of chamber 25 in housing member 21 wherein unit plurality 13, 15 may be inserted into the chamber part in a direction generally parallel (i.e., as compared to the vertical or long side of the drawing sheet as best seen in FIG. 2) to intermediate wall 43 into mounting engagement with housing member 21 when housing member 23 is separated therefrom, as discussed in greater detail hereinafter.

Figure 3:
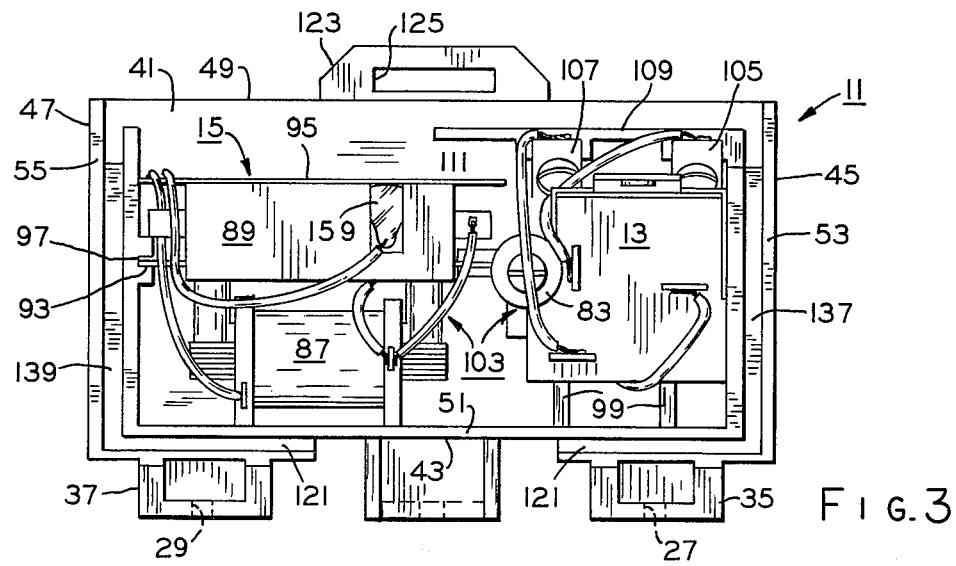
FIG. 3 is a top sectional view of FIG. 2.

Referring again to the drawings in general and recapitulating at least in part, with respect to the foregoing, load controller 11 in one form of the invention has unit plurality 13, 15 and a separable housing including housing members 21, 23 having a plurality of wall means defining chamber 25 in which the unit plurality is enclosed (FIGS. 1 and 2). Support means, such as a rib or extension means 71 or the like, is integrally formed with at least one wall means, such as end wall 41, of the wall means plurality and extends into chamber 25 between another pair of wall means, such as sidewalls 45, 47 and 67, 69 of housing members 21, 23, of the wall means plurality (FIG. 5). A free end portion 73 is provided on rib or support means 71 within chamber 25, and a pair of means, such as opposite guiding grooves or recesses 75, 77 including seats 79, 81, are provided in the rib for releasably receiving in mounting engagement a part of the unit pair 13, 15, respectively (FIGS. 2, 3 and 5). Means, such as a screw and washer assembly 83 or the like for instance, is threadedly received or otherwise connected to free end portion 73 of rib 71 for respective positioning or displacement preventing engagement with unit pair 13, 15 so as to retain them against displacement from receiving means or rib grooves 75, 77 (FIGS. 2 and 3).

More particularly and with specific reference to FIGS. 2 and 3, operating component unit 13 of load controller 11 comprises a condition responsive device which includes a sensing means or element 85, and such temperature condition responsive device may be a model 3ART24 available from General Electric Company, Morrison, Illinois; however, it is contemplated that various other temperature condition response devices as well as condition responsive devices other than those responsive to temperature may be utilized in load controller 11 in one form of the invention as to meet the objects and advantageous features thereof. Operating component unit 15 of load controller 11 comprises a sequence timing device including the usual speed reduction gear train (not shown) and preferably a synchronous clock motor 87, and such sequence timing device may be a model 3ASP16EJ10G1B available from the General Electric Company, Morrison, Illinois; however, it is contemplated that other timing devices may be employed in load controller 11 in one form of the invention so as to meet the objects and advantageous features thereof. For instance, a switch device 89 and a cam means 91 driven by motor 87 are included in the aforementioned model of the sequence timer device; however, it is contemplated that other switches and cam means may be utilized and may be provided separately with respect to the sequence timer device within the scope of the invention so as to meet the objects thereof. Switch 89 may be a model 3ASM5 also available from the General Electric Company, Morrison, Illinois.

Sequence timer device 15 includes a pair of face plates 93, 95 between which motor 87, switch 89, cam means 91 and the reduction gearing (not shown) are mounted. In order to assemble timer device 15 into housing member 21, the timer device is moved generally in one direction into the part of chamber 25 defined by housing member 21 with face plates 93, 95 generally parallel to intermediate wall 43. As timer device 15 is being passed into chamber 25, a side edge or part of face plate 93 is entered into groove 77 and slidably and guidably moved therein into engagement with seat 81, and if desired, another receiving means, such as another guiding groove or recess 97, may be provided in sidewall 47 of housing member 21 to similarly receive the opposite side edge or part of face plate 93. However, it is contemplated that the opposite side edge of face plate 93 may merely be disposed in abutment with sidewall 47 of housing member 21 so as to eliminate the need for groove 97 in one form of the invention so as to meet the objects thereof.

Groove 75 of rib 71 is shaped to guidably and slidably receive a mating part of condition responsive device 13 as it is entered into the part of chamber 25 defined by housing member 21 generally in the aforementioned one direction, i.e., generally parallel with intermediate wall 43. As condition responsive device 13 is being passed into chamber 25, a corner or part of the condition responsive device is slidably and guidably entered into groove 75 and moved into engagement with seat 79. Other parts of condition responsive device 13 are loosely seated or disposed generally in abutting engagement with sidewall 45 of housing member 21 and another abutment surface 99 provided on intermediate wall 43. However, it is contemplated that a plate or housing ears (not shown) could be provided on condition responsive device 13 for reception in groove 75 and another groove (not shown) in sidewall 45 generally in the same manner as discussed hereinabove with respect to timer device 15 without departing from the invention so as to meet the objects thereof.

The disposition of condition responsive device 13 and timer device 15 in housing member 21 in cooperation with intermediate wall 43, sidewall 45 and groove 75 and with grooves 77, 97, respectively, generally obviates displacement movement of the condition responsive device and the timing device from their assembled positions except generally in the direction opposite to the one direction in which such devices were inserted into chamber 25, as previously discussed. In order to prevent displacement movement of condition responsive device 13 and timer device 15 in the aforementioned another or opposite direction, screw and washer assembly 83 is threadedly engaged with free end portion 73 of rib 71 and disposed in abutment with adjacent cooperating parts of the condition responsive device and timer device. Although, a bore 101 is shown in FIG. 5 for receiving the screw of assembly 83, it is understood that such screw may be of the self-tapping type thereby to obviate the need of bore 101. If desired, the washer of assembly 83 may be formed from a dielectric material. While screw and washer assembly 83 is disclosed for retaining condition responsive device 13 and timer device 15 in their assembled positions in housing member 21 against displacement therefrom, it is contemplated that other displacement restraining or locking devices may be utilized within the scope of the invention so as to meet the objects thereof. With condition responsive device 13 and timer device 15 so disposed in their assembled positions in housing member 21, the various electrical leads thereof, indicated generally at 103, may be soldered or otherwise electrically connected with a pair of terminals 105, 107 suitably mounted or retained in a block 109 integrally formed on end wall 41 of housing member 21. A third terminal 111 extends from timing device 15 so as to be disposed generally adjacent terminals 105, 107 for ease of connecting with utility company leads which are lead into chamber 25 through an opening 113 provided in end wall 41 adjacent the terminals.

With reference again in general to the drawings and recapitulation, at least in part, with respect to the foregoing, load controller 11 in one form of the invention has condition responsive device 13 with sensing means 85 associated therewith for sensing a preselected condition, such as atmospheric temperature, and also timer device 15 (FIGS. 2–4), and separable housing members 21, 23 include the wall means plurality, as previously discussed, defining chamber 25 in which such devices are mounted (FIGS. 5 and 8). Means, such as a hollow extension or closed tube 115 for instance, is associated with housing member 21 for receiving at least a part of sensor or sensing means 85 so that it is predeterminately spaced from the immediate environment of devices 13, 15 in chamber 25. This receiving means or extension 115 extends beyond end wall 41 of housing member 21 and includes another chamber 117 enclosed within the extension and communicating with chamber 25 and into which sensor 85 extends (FIG. 2).

More particularly and with specific reference to FIG. 2, sensor 85 may contain a volatile gas or liquid or combination thereof which is, of course, temperature responsive; therefore, it is desirable to predeterminately space the sensor from any heat in chamber 25 which may be generated upon the operation of timing device 15. Therefore, by disposing sensor 85 in chamber 117 of extension 115, the sensor is, at least in part, generally isolated from any heat in the immediate environment of devices 13, 15 in chamber 25. Thus, sensor 85 will more accurately ascertain the instantaneous value of the atmospheric temperature to which it is subjected through a small orifice, such as a breather or condensation drain hole 119 or the like for instance, provided through the lower or closed end of extension 115. Preferably, extension 115 is integrally formed with end wall 41 of housing member 21; however, it is also contemplated that a separate extension could be cemented, fused or otherwise connected to the end wall within an opening (not shown) therein within the scope of the invention so as to meet the objects thereof. It is also contemplated that a separate extension may be extended through an opening (not shown) in end wall 41 with a flange (not shown) extending from such separate extension into abutment with the end wall about such opening within the scope of the invention so as to meet the objects thereof.

Figure 4:
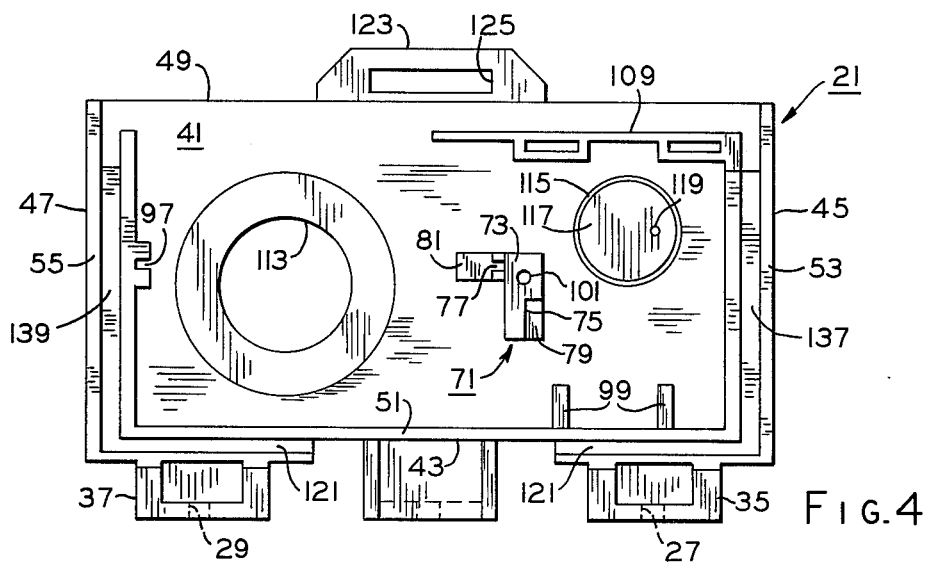
FIG. 4 is a top elevation view of one of the housings of the load controller with the operating component units thereof removed for clarity.

Referring to the drawings again in general and recapitulating, at least in part with respect to the foregoing, load controller 11 in one form of the invention has devices 13, 15, and housing members 21, 23 are adapted for releasable engagement with each other and moveable with respect to each other generally only in one direction and another direction opposite thereto (i.e., generally vertically as shown by the opposite direction arrows in FIG. 1) into assembled positions in the releasable engagement with each other (FIGS. 1, 2 and 6). The plurality of wall means on each of housing members 21, 23, as previously discussed, defines chamber 25 therein in which devices 13, 15 are enclosed when the housing members are disposed in their assembled positions in the releasable engagement with each other. Interrupted groove or recess means 121 are provided in end portion 51 of intermediate wall 43 on housing member 21 and extend generally in the one and another directions (see directional arrow in FIG. 1), and extension means, such as a stationary hasp 123 for the like, is integrally formed with end portion 49 of end wall 41 on housing member 21, the extension means or hasp including an opening or slot means 125 extending therethrough generally in the one and another directions (FIGS. 2–4). A pair of means, such as a tongue or flange extension 127 and a tongue or stationary hasp 129, are integrally formed on end portions 63, 65 of end and intermediate walls 39, 57 of housing member 23 for extending into groove means 121 and slot means 125 upon the movement of housing members 21, 23 with respect to each other generally only in the one and another directions (see directional arrow in FIG. 1) into their assembled positions, respectively (FIGS. 1–4 and 8.

More particularly and with specific reference to FIGS. 2, 3 and 8, when housing members are moved into their assembled positions in releasable engagement with each other, extending means or tongue 127 on end wall 39 of housing member 23 is guided generally vertically or in the one direction downwardly so as to be received in groove means 121 in intermediate wall 43 of housing member 21. At the same time, hasp 129 on intermediate wall 57 of housing 23 is guided generally vertically through slot means 125 of hasp 123 on end wall 41 of housing member 21. In this manner, the sliding and guiding engagement of tongue 127 in groove means 121 and the sliding and guiding engagement of hasp 129 within slot means 125 of hasp 123 effectively predetermines the movement of housing members 21, 23 into their assembled positions in releasable engagement with each other with such movement being limited only to that in the one and another directions (see directional arrow of FIG. 1). With housing members 21, 23 so disposed in their assembled positions, the parting section therebetween is, of course, closed with end portions 63, 65 and side margin portions 67, 69 of housing member 23 respectively seated on or disposed in opposed relation with mating end portions 51, 49 and side margins 55, 53 of housing member 21 thereby to close chamber 25. Hasp 129 of housing member 23 is also provided with an opening 131 therethrough, and in order to prevent surreptitious or unauthorized movement of housing members 21, 23 from their assembled positions in releasable engagement with each other, a locking device, such as a small steel cable or the like 133, may be threaded through slot means 125 of hasp 123 and opening 131 in hasp 129 with the free ends of the cable being joined by an interconnecting wafer 135 or the like which may be formed any malleable material, such as lead for instance, as shown in FIG. 1.

Each of side margin portions 53, 55 of housing member 21 include groove or slot means 137, 139 which interconnect with groove means 121 in end portion 51 of intermediate wall 43 and also with end portion 49 on end wall 41, FIGS. 2 and 3. With the housing members 21, 23 in their assembled positions, as described above, any water or moisture which may collect in groove means 121, 137, 139 drains therefrom between end portions 49, 65 of the housing members exteriorly of load controller 11. If desired, a suitable seal or gasket (not shown) may be interposed between housing members 21, 23. Furthermore, when load controller 11 is mounted in its preferred attitude to a support therefor, as shown in FIG. 1, it may be noted that end wall 41 of housing member 21 slopes toward clasp 123, and any moisture which might drain down grooves 137, 139 in side margin portions 53, 55 would continue to drain to the exterior of housing members 21, 23 as would any condensation which may accumulate in chamber 25.

In FIG. 9, there is shown an exemplary circuit 141 for load controller 11 with housing members 21, 23 thereof indicated in dotted outline. Terminals 105, 111 of load controller 11 are coupled across power source 17 comprising, for instance, a 24 volt secondary winding 143 of a transformer 145 adapted to have its primary winding connected across the line of the utility company (not shown). An indoor or room type thermostat 147 may have its contacts serially connected with power source 17, and when the room thermostat is "calling", i.e., with its contacts closed, contactor or relay coil, which for the purposes of this discussion comprises load 19, is energized or closed. It is to be understood that contactor 19 operates an exemplary load associated therewith and ordinarily connected across the utility line, but to simplify the discussion, contactor 19 is referred to as the exemplary load which, of course, may be an air conditioning unit, a heating unit or other appliance type load.

Assume that the preselected condition is a selected value or level of the atmospheric temperature, say 95° F for instance, which is chosen to be indicative of the occurrence of a peak power demand period on the utility company's lines. Therefore, upon the occurrence of the preselected condition, sensing means 85 of condition responsive device 13 senses the temperature level indicative of the occurrence of the peak power demand period and actuates its associated switch 149 to a closed position. In this manner, condition responsive device 13 is operable to initiate or effect the energization of timer device 15 wherein timer motor 87 is coupled in circuit relation through closed switch 149 across power source 17, and the condition responsive device will maintain the timer motor so energized as long as the preselected condition sensed by sensor 85 exists.

Upon its energization, timer motor 87 rotatably drives cam means 91 so as to move a current carrying blade 151 of switch 89 from its engagement with switch contact 153 to a position engaged with switch contact 155. In this manner, the circuit energizing contactor 19 across power source 17 is interrupted upon the disengagement of switch blade 151 from switch contact 153, and a holding circuit, indicated generally at 157, for timer motor 87 is completed across the power source when the switch blade is made with switch contact 155. Thus, the driven rotation of cam 91 by timer motor 87 effects the alternate periodic or cyclical engagement of switch blade 151 with switch contacts 153, 155 for predetermined time periods which effects the alternate energization and de-energization of contactor 19 and holding circuit 157, respectively.

In the event of the termination of the preselected condition during a predetermined time period when switch blade 151 is engaged with switch contact 155, sensor 85 will, of course, ascertain the temperature change and re-open its associated switch 149; however, since holding circuit 157 is made when switch blade 151 makes with switch contact 155, timer motor 87 will continue to be energized through the holding circuit even though switch 149 of condition responsive device 13 is open. This continued energization of timer motor 87 through holding circuit 157 is effective until cam 91 is driven to the end of the predetermined time period whereupon the cam moves switch blade 151 into re-engagement with switch contact 153. Thus, holding circuit 157 is interrupted upon the disengagement of switch blade 151 from switch contact 155, and contactor 19 is re-energized across power source 17 when the switch blade re-engages switch contact 153.

If desired, indicating means, such as a lamp 159 for instance, may be connected in circuit relation across timer motor 87 so as to be energized conjointly with the motor and indicate when it is operative. Also, a resistor 161 may be provided in condition responsive device 13 connected in shunt with switch 149 thereof. When switch 149 is closed, resistor 161 will draw essentially no current but will receive some current by way of parallel combination of timer motor 87 and lamp 159 when switch 149 is open. Resistor 161 may be placed in close proximity to condition responsive device 13 so that it will not 129 in its operation in response to increasing atmospheric temperature. If a more detailed explanation of the operation of load controller 11 is desired, reference may be made to copending application Ser. No. 766,387 filed Feb. 7, 1977, which is incorporated herein by reference. Of course, it is contemplated that circuits other than the exemplary circuit 141 disclosed herein may be utilized in load controller 11 within the scope of the invention so as to meet the objects and advantageous features thereof.

While the operation of load controller 11 has been outlined with reference to a so-called "summer daytime peak" utility company, it is to be understood that such load controller may be employed in areas in which peak power demands are experienced in the winter months during evening hours and only when the atmospheric temperature drops below a preselected temperature value or level. In a "winter evening peak" area, sensor 85 of condition responsive device 13 would sense a preselected temperature value or level of about 24° F for instance, and the condition responsive device would only energize timer motor 87 when the atmospheric temperature fell below such preselected value of 24° F. Further, it is to be understood that the term switch or switch means, as used herein, encompasses not only mechanical make and break type switches, but also solid state devices, such as SCR's, etc., in which the conductivity mode or state changes from conductive to generally non-conductive.

From the foregoing, it is now apparent that a novel load controller 11 has been presented meeting the objects and advantageous features set forth hereinbelow as well as others, and it is contemplated that changes as to the precise arrangements, shapes, details and connections of the components of the load controller may be made by those having ordinary skill in the art without departing from the spirit of the invention or the scope thereof, as illustrated by the claims which follow.

What I claim as new and desire to secure by Letters Patent in the United States is:

1. In a load controller having a plurality of operating component units adapted for controlling the supply of power from a source thereof to a load, a pair of separable housings adapted for releasable engagement with each other and movable with respect to each other generally only in one direction and another direction opposite theretor into assembled positions in the releasable engagement with each other, a pair of securing means receiving apertures in one of the housing members and adapted for ready access when the housing members are separated from each other, wall means on the housing members and defining a chamber in which the unit plurality is enclosed when the housing members are disposed in their assembled positions in the releasable engagement with each other, the wall means including a pair of opposed end walls on the housing members, respectively, a pair of opposed intermediate walls on the housing members and integral with the end walls, respectively, and first and second pairs of side walls on the housing members and integral with both the end walls and the intermediate walls, respectively; the improvement comprising a first pair of end portions on the end wall and the intermediate wall of the one housing member with said first end portion pair being spaced both laterally and in the one and another directions with respect to each other, a second pair of end portions on the end wall and the intermediate wall of the other housing member with said second end portion pairs being spaced both laterally and in the one and another directions with respect to each other, said first end portion pairs being disposed generally in opposed relation with said second end portion pairs when the housing members are in their assembled positions, first and second pairs of margin portions on the first and second sidewall pairs of the one and other housing members and intersecting with said first and second end portion pairs, respectively, said first and second margin portions being disposed generally in opposed relation with each other when the housing members are in their assembled positions, said first and second end portion pairs and said first and second margin portions generally comprising a parting section between the housing members predeterminately arranged so as to provide ready access to a part of the chamber in the one housing member wherein at least a pair of the units of the unit plurality may be moved generally in the one and another directions into and from the chamber part when the housing members are separated, support means integral with at least the end wall of the one housing member and disposed at least in part in spaced relation between the first sidewall pair of the one housing member, an end surface on said support means, a pair of means in said support means for respectively releasably receiving a pair of the at least unit pair in mounting engagement when the at least unit pair are moved in the one direction into the chamber part, means connected with said end surface of said support means for respective positioning engagement with the at least unit pair so as to retain them against displacement from said receiving means, groove means in one of said end portions of said first end portion pairs and extending generally in the one and opposite directions, extension means integral with the other of said end portions of said first end portion pairs, said extension means including slot means extending therethrough generally in the one and another directions, a pair of means integral with said second end portion pairs for respective disposition in said groove means and said slot means upon the movement of the housing members with respect to each other generally only in the one and another directions into their assembled positions in releasable engagement with each other, means extending from the intermediate wall of the one housing exteriorly of the chamber for mounting the load controller and in which the aperture plurality is located, and the other of the end walls of the end wall pair including means disposed generally in overlaying relation with said securing means for at least in part covering the aperture plurality so as to obviate ready access thereto when the housing members are disposed in their assembled positions in releasable engagement with each other.

2. In a load controller having a plurality of operating component units adapted for controlling the supply of power from a source thereof to a load, a pair of separable housing members releasably engaged with each other so as to define a chamber in which the units are enclosed, and a pair of securing means receiving apertures in one of the housing members adapted for ready access when the other of the housing members is disengaged from the one housing member; the improvement comprising means on the one housing member exteriorly of the chamber for mounting the load controller and in which the apertures are positioned, and means on the other housing member disposed generally in overlaying relation with said mounting means for at least in part covering the apertures so as to obviate the ready access thereto when the housing members are disposed in the releasable engagement with each other.

3. In a load controller having at least a pair of operating component units adapted for controlling the supply of power to a load, a separable housing having a plurality of wall means defining a chamber in which the at least pair of units are enclosed; the improvement comprising support means integral with at least one of the wall means of the wall means plurality and extending into the chamber between another pair of the wall means of the wall means plurality, a free end portion on said support means within the chamber, a pair of means in said support means for releasably receiving in mounting engagement a part of the at least pair of units, respectively, and means connected to said free end portion of said support means for respective positioning engagement with the at least pair of units so as to retain them against displacement from said receiving means.

4. In a load controller having a plurality of operating component units adapted for controlling the supply of power from a source thereof to a load and including a condition responsive device having associated therewith means for sensing a preselected condition, a pair of separable housing members releasably engaged with each other and including a plurality of wall means defining a chamber in which the unit plurality is mounted; the improvement comprising means associated with one of the housing members for receiving at least a part of the sensing means so that it is predeterminately spaced from the immediate environment of the unit plurality in the chamber, said receiving means extending beyond one of the wall means of the wall means plurality and including another chamber enclosed within said receiving means and communicating with the first named chamber and into which the at least part of the sensing means extends.

5. In a load controller having a plurality of operating component units adapted for controlling the supply of power from a source thereof to a load, a pair of separable housing members adapted for releasable engagement with each other and movable with respect to each other generally only in one direction and another direction opposite thereto into assembled positions in the releasable engagement with each other, a plurality of wall means on each of the housing members defining a chamber in which the unit plurality is enclosed when the housing members are disposed in their assembled positions in the releasable engagement with each other; the improvement comprising a pair of free end portions on a pair of the wall means of the wall means plurality of one of the housing members and spaced from each other both laterally and in the one and another directions, respectively, groove means in one of said free end portions and extending generally in the one and another directions, extension means integral with the other of said free end portions, said extension means including slot means extending therethrough generally in the one and another directions, and a pair of means integral with a pair of the wall means of the wall means plurality of the other of the housing members for extending into said groove means and said slot means upon the movement of the housing members with respect to each other generally only in the one and another directions into their assembled positions, respectively.

6. In a load controller having a plurality of operating component units adapted for controlling the supply of power from a source thereof to a load, a pair of separable housing members adapted for releasable engagement with each other and defining a chamber in which the unit plurality is mounted, the housing members respectively including a pair of opposed end walls, a pair of opposed intermediate walls respectively integral with the end walls, and first and second pairs of opposed side walls respectively integral with both the end walls and the intermediate walls; the improvement comprising means for generally defining a parting section between the housing members so as to provide ready access to a part of the chamber in one of the housing members wherein the unit plurality may be inserted into the chamber part in a direction generally parallel to one of the intermediate walls into mounting engagement with the one housing member when the other of the housing members is separated therefrom, said parting section defining means including a first pair of free end portions on the end walls and spaced from the intermediate walls integral with the end walls, respectively, a second pair of free end portions on the intermediate walls and spaced from the end walls integral with the intermediate walls, respectively, said first free end portion pairs being disposed generally adjacent said second free end portion pairs when the housing members are engaged with each other, and first and second pairs of free margin portions on the first and second sidewall pairs and intersecting with said first and second free end portion pairs, respectively, said first and second free margin portion pairs being disposed generally in opposed relation with each other when the housing members are engaged with each other.

7. The load controller as set forth in claim 2 wherein said mounting means comprises a pair of lugs integral with the one housing member, the apertures being respectively positioned in said lugs.

8. The load controller as set forth in claim 2 wherein said covering means comprises wall means of the other housing member.

9. The load controller as set forth in claim 2 wherein said mounting means includes means disposed generally about the apertures for at least in part shrouding them, said covering means being disposed at least in part adjacent said shrouding means.

10. The load controller as set forth in claim 2 wherein the housing members respectively have a plurality of wall means enclosing the chamber, said covering means comprising one of the wall means of the wall means plurality of the other housing member, and said mounting means being integral with one of the wall means of the one housing member.

11. The load controller as set forth in claim 2 wherein at least the one housing member has a plurality of wall means, said mounting means comprising at least a pair of means integral with one of the wall means of the wall means plurality for extending therefrom generally into close spaced relation with said covering means, the apertures being disposed in said extending means, respectively.

12. The load controller as set forth in claim 2 wherein one of the units of the plurality thereof is a condition responsive device operable generally in response to the occurrence of a preselected condition for initiating the the operation of the load controller.

13. The load controller as set forth in claim 2 wherein one of the units of the plurality thereof is a sequence timer device adapted for energization to periodically effect the supply of the power to the load.

14. The load controller as set forth in claim 13 wherein another of the units of the plurality thereof is a temperature condition responsive device having means for sensing a preselected atmospheric temperature condition and operable generally upon the occurrence of the preselected atmospheric temperature condition to initiate the energization of the sequence timer device.

15. The load controller as set forth in claim 3 wherein said receiving means comprise a pair of opposite groove means in said support means in which the at least pair of unit parts are received in the mounting engagement.

16. The load controller as set forth in claim 3 wherein said support means includes a pair of means associated with said receiving means for seating the at least pair of unit parts in the mounting engagement.

17. The load controller as set forth in claim 3 further comprising another means in one of the another wall means pair for releasably receiving another part of one of the at least pair of units in mounting engagement therewith.

18. The load controller as set forth in claim 3 wherein at least one of the wall means of the another wall means pair is disposed in mounting engagement with at least one of the at least pair of units.

19. The load controller as set forth in claim 3 wherein said positioning engagement means comprises means disposed in releasable engagement with said support means and engaged with respective parts of the at least pair of units for generally locking them against the displacement from the mounting engagement with said receiving means 20. The load controller as set forth in claim 3 wherein at least one of the wall means of the another wall means pair is disposed in mounting engagement with at least one of the at least pair of units, said receiving means comprising a pair of opposite groove means in said support means in which the respective part of the at least pair of units is received in the mounting engagement, means on said support means and respectively associated with said groove means for seating the at least pair of units in said groove means, and said positioning engagement means comprising means disposed in releasable engagement with said support means and adapted for abutment with another part of the at least pair of units so as to maintain them in the mounting engagement with said groove means against displacement therefrom.

21. The load controller as set forth in claim 3 wherein one of the at least pair of units is a sequence timer device adapted for energization to periodically effect the supply of power to the load.

22. The load controller as set forth in claim 21 wherein the part of the sequence timer device received in the mounting engagement with one of said receiving means is an edge portion of a face plate of the sequence timer device.

23. The load controller as set forth in claim 21 wherein the other of the at least pair of units is a condition responsive device operable generally upon the occurrence of a preselected condition for effecting the energization of the sequence timer device.

24. The load controller as set forth in claim 3 wherein one of the at least pair of units is a temperature condition responsive device operable generally upon the occurrence of a preselected atmospheric temperature condition to effect the operation of the load controller, the temperature responsive condition device having a housing, and the part of the one of the at least pair of units received in one of said receiving means being a part of the housing.

25. The load controller as set forth in claim 4 further comprising means in said receiving means for venting said another chamber to the atmosphere.

26. The load controller as set forth in claim 4 wherein said receiving means includes a free end portion, and an orifice in said free end portion communicating said another chamber with the atmosphere.

27. The load controller as set forth in claim 4 wherein said receiving means comprises extension means connected with the one housing member so as to extend beyond the one wall means thereof.

28. The load controller as set forth in claim 4 wherein said receiving means comprises means for removable engagement with the one housing member so as to extend therefrom beyond the one wall means thereof.

29. The load controller as set forth in claim 4 wherein said receiving means comprises extension means having a pair of opposite end portions, one of said opposite end portions being connected with the one wall means of the one housing and the other of said opposite end portions being predeterminately spaced beyond the one wall means of the one housing, and orifice means extending through said other opposite end portion for effecting restricted communication of both the first named chamber and said another chamber with the atmosphere.

30. The load controller as set forth in claim 4 wherein the plurality of units further includes a sequence timer device energized by the condition responsive device upon the occurrence of the preselected condition sensed by the sensing means to periodically establish and interrupt the supply of power to the load.

31. The load controller as set forth in claim 5 further comprising another pair of free end portions on the wall means pair of the other housing member and spaced from each other both laterally and in the one and another directions, said another free end portion pair being disposed generally in opposed relation with the first named free end portion pair when the housing members are in their assembled positions in the releasable engagement with each other, respectively.

32. The load controller as set forth in claim 5 further comprising another pair of free end portions on the wall means pair of the other housing member, said extending means being associated with said another free end portion pair, respectively.

33. The load controller as set forth in claim 5 wherein one of said extending means comprises a hasp extending through said slot means.

34. the load controller as set forth in claim 5 wherein one of said extending means comprises a tongue extending into said groove means.

35. The load controller as set forth in claim 5 further comprising means associated with one of said extending means and said extension means for maintaining the housing members generally in their assembled positions against separation in the one and another directions from each other.

36. The load controller as set forth in claim 5 wherein one of the units of the plurality thereof is a sequence timer device operable generally upon energization to periodically establish and interrupt the supply of power to the load.

37. The load controller as set forth in claim 36 wherein another of the units of the plurality thereof is a condition responsive device operable generally upon the occurrence of a preselected condition to effect the energization of the sequence timer device.

38. The load controller as set forth in claim 6 further comprising means on the one intermediate wall and exteriorly of the chamber for mounting the one housing member including a plurality of securing member receiving aperture means adapted for ready access when the other housing member is separated from the one housing member, and one of the end walls on the other housing member being disposed at least in close spaced relation with said mounting means so as to at least in part obviate the ready access to said aperture means when the housing members are engaged with each other.

39. The load controller as set forth in claim 6 further comprising means on one of the end walls of the one housing for extending into the chamber and including means for receiving in mounting engagement a part of at least a pair of the units, respectively.

40. The load controller as set forth in claim 39 further comprising means associated with said extending means for respective positioning engagement with the respective part of the at least unit pair so as to retain them against displacement from said receiving means.

41. The load controller as set forth in claim 6 wherein one of the units of the unit plurality is a temperature responsive condition device having means associated therewith for sensing a preselected atmospheric temperature condition to effect the operation of the load controller.

42. The load controller as set forth in claim 41 further comprising means associated with one of the end walls of the one housing and extending therebeyond exteriorly of the chamber for receiving the sensing means, said extending means including another chamber associated with the first named chamber and in which the sensing means is at least in part disposed.

43. The load controller as set forth in claim 6 wherein one of the units of the unit plurality is a sequence timer device adapted upon energization for periodically establishing and interrupting the supply of power to the load.

44. The load controller as set forth in claim 43 including switching means associated with the sequence timer device and operable between a pair of conductivity modes, the switching means being operable in one of the conductivity modes thereof to effect the supply of power to the load and in the other of the conductivity modes thereof to interrupt the supply of power to the load, and cam means driven by the sequence timer device for operating the switching means.

* * * * *